(12) United States Patent
Eddy (10) Patent No.: US 10,190,467 B1
(45) Date of Patent: Jan. 29, 2019

(54) EXHAUST TURBOSONIC GENERATOR FOR VEHICLES

(71) Applicant: Laurence D Eddy, San Diego, CA (US)

(72) Inventor: Laurence D Eddy, San Diego, CA (US)

( * ) Notice: Subject to any disclaimer, the term of this patent is extended or adjusted under 35 U.S.C. 154(b) by 0 days.

(21) Appl. No.: 15/704,559

(22) Filed: Sep. 14, 2017

(51) Int. Cl.
```
F01N 5/04      (2006.01)
H02K 7/18      (2006.01)
F01N 1/24      (2006.01)
F01N 1/02      (2006.01)
```

(52) U.S. Cl.
CPC ............. *F01N 5/04* (2013.01); *F01N 1/02* (2013.01); *F01N 1/24* (2013.01); *H02K 7/1823* (2013.01)

(58) Field of Classification Search
CPC .... F01N 5/04; F01N 1/02; F01N 1/24; H02K 7/1823
See application file for complete search history.

(56) References Cited

U.S. PATENT DOCUMENTS

| | | | | |
|---|---|---|---|---|
| 4,199,936 A | * | 4/1980 | Cowan | F01N 1/02 60/226.1 |
| 5,280,143 A | * | 1/1994 | Kakuta | F01N 1/10 181/250 |
| 6,058,698 A | * | 5/2000 | Coral | B01D 53/32 422/186.04 |
| 6,161,646 A | * | 12/2000 | Curl | F01D 25/30 181/238 |
| 7,451,849 B1 | * | 11/2008 | Zuberi | F01N 3/2835 180/218 |
| 8,851,231 B1 | * | 10/2014 | Murphy | F01N 1/083 181/237 |
| 2003/0066285 A1 | * | 4/2003 | Raybone | B01D 53/9418 60/275 |
| 2004/0088977 A1 | * | 5/2004 | Huang | F01N 1/18 60/607 |
| 2006/0075745 A1 | * | 4/2006 | Cummings | F01N 1/088 60/315 |
| 2007/0090649 A1 | * | 4/2007 | Moore | F02C 6/18 290/2 |
| 2007/0284178 A1 | * | 12/2007 | Scanlon | F41A 21/30 180/309 |
| 2009/0015019 A1 | * | 1/2009 | Donaghey | F03D 3/002 290/55 |
| 2011/0186376 A1 | * | 8/2011 | Maurer | F01N 1/006 181/211 |

(Continued)

*Primary Examiner* — Viet Nguyen
(74) *Attorney, Agent, or Firm* — Thibault Patent Group (57) ABSTRACT

Described is a turbosonic generator for generating electricity for a vehicle and for attenuating sound from the vehicle's internal combustion engine. The turbosonic generator comprises a turbosonic generator housing, a driveshaft, a ventilated tube enclosing the driveshaft, the ventilated tube comprising first and second ends, the first end formed through a first end partition of the turbosonic generator housing and comprising an inlet for receiving exhaust gasses from a vehicle engine, and the second end sealed for preventing the exhaust gasses from escaping through the second end, the ventilated tube further comprising exhaust orifices for allowing the exhaust gasses to escape the ventilated tube, and means, coupled to a first end of the driveshaft, for producing electricity as the exhaust gasses cause the driveshaft to rotate.

18 Claims, 6 Drawing Sheets

(56) References Cited

U.S. PATENT DOCUMENTS

2014/0041959 A1* 2/2014 Won .................. F01N 1/083
181/256
2014/0090366 A1* 4/2014 Akbar ................ F03D 9/002
60/398

* cited by examiner

EXHAUST TURBOSONIC GENERATOR FOR VEHICLES

BACKGROUND

I. Field of Use

The present application relates to automotive industry. More specifically, the present application relates to a device for generating electricity for a vehicle by utilizing vehicle exhaust.

II. Description of the Related Art

Modern vehicles increasingly rely on new electronic technology to provide things such as entertainment, safety, operational aspects (such as the use of electric motors) and self-driving capabilities. The energy consumed by these capabilities is not inconsequential. In order to meet these increased energy needs, vehicle manufacturers must incorporate ever more demanding energy-producing components, such as alternators, generators and batteries, which adds additional expense to the price of vehicles.

SUMMARY

The embodiments described herein relate to a turbosonic generator for generating electricity for a vehicle and for attenuating sound emanating from the vehicle's internal combustion engine. In one embodiment, a turbosonic generator comprises a turbosonic generator housing, an axial fan bladed shaft, a ventilated tube enclosing the axial fan bladed shaft, the ventilated tube comprising first and second ends, the first end formed through a first end partition of the turbosonic generator housing and comprising an inlet for receiving exhaust gasses from a vehicle engine, and the second end abutting a second end partition of the turbosonic generator housing comprising a seal for preventing the exhaust gasses from escaping the second end, the ventilated tube further comprising exhaust orifices for allowing the exhaust gasses to escape the ventilated tube, and means, coupled to a first end of the axial fan bladed driveshaft, for producing electricity as the exhaust gasses cause the driveshaft to rotate.

In another embodiment, a turbosonic generator comprises a turbosonic generator housing formed as a first cylindrical body, a ventilated tube disposed within the first cylindrical body comprising an inlet for receiving exhaust gasses from a vehicle engine, and an outlet port for allowing the exhaust gasses to escape, the ventilated tube further comprising orifices for allowing sound associated with the exhaust gasses to escape from the ventilated tube, an axial fan bladed shaft disposed within the ventilated tube, porous, sound-absorptive packing material placed between the ventilated tube and the turbosonic generator housing, and means, coupled to the driveshaft, for producing electricity as the exhaust gasses cause the axial fan bladed driveshaft to rotate.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present description relates to a turbosonic generator for generating electricity for use in vehicles. The purpose of the turbosonic generator is to recover latent energy locked in a waste gas exhaust stream from an internal combustion engine, while attenuating the sound from the engine as traditional mufflers provide. The electrical energy produced by the turbosonic generator can be used to charge batteries, operate various electronic devices on or within a vehicle, power electric motors for supercharging or driving wheel motors, etc.

Figure 1:
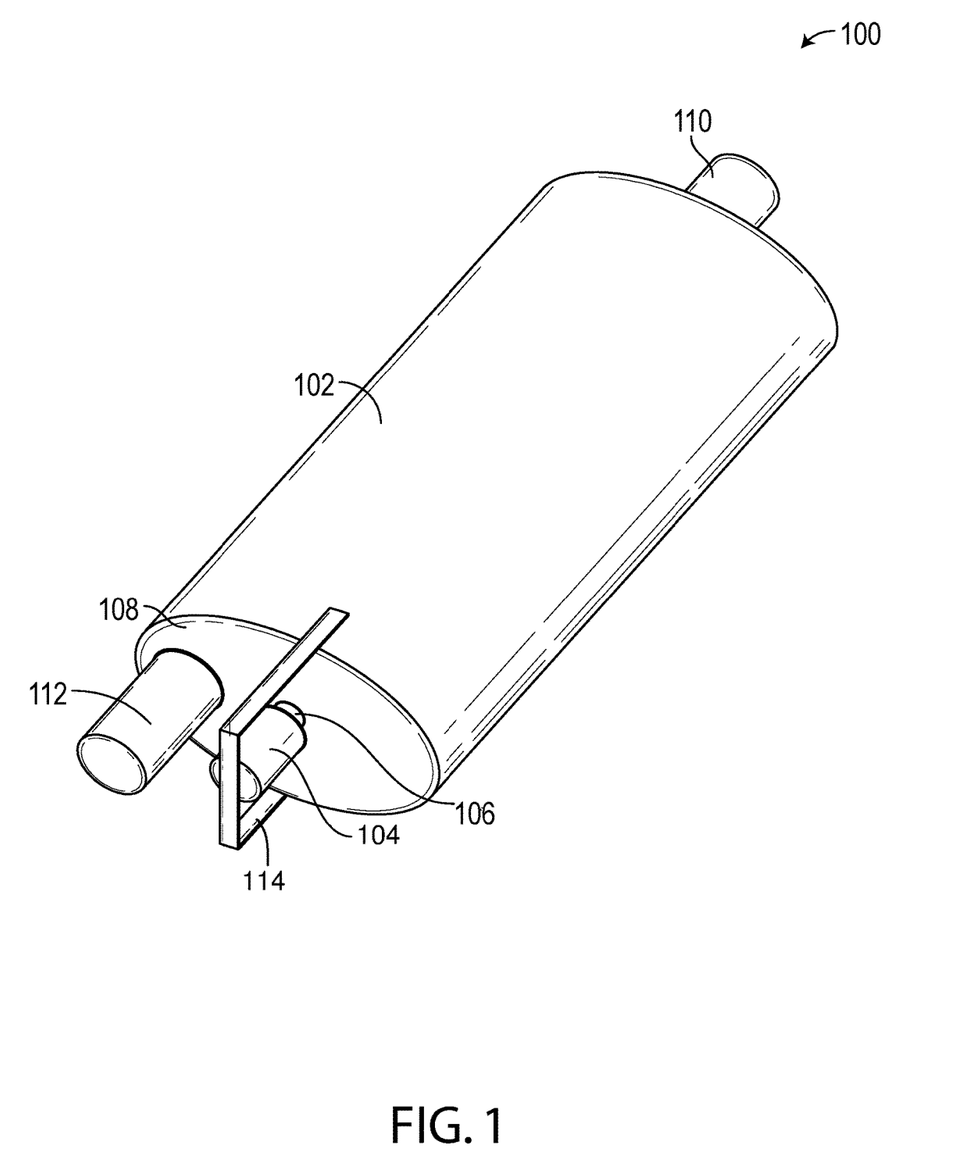
FIG. 1 illustrates one embodiment of a turbosonic generator in accordance with the inventive principles described herein.

FIG. 1 illustrates one embodiment of turbosonic generator 100 in accordance with the inventive principles described herein. Shown is a turbosonic generator housing 102, electric generator 104 mechanically coupled to a driveshaft 106 protruding from one end 108 of turbosonic generator housing 102. Also shown is inlet 110, exhaust port 112 and bracket 114.

Turbosonic generator 100 is installed into a vehicle exhaust system, with inlet 110 coupled to an exhaust pipe emanating from a vehicle exhaust manifold and exhaust port 112 typically coupled to a vehicle tail pipe. Exhaust gasses produced by a vehicle engine is received via inlet 110, which causes driveshaft 106 to rotate which, in turn, turns one or more gears, cables, pulleys, universal joints, chains, belts, or other mechanical devices that drives electric generator 104. Alternatively, driveshaft 106 may be used as a mechanical power take-off device to drive devices other than, or in addition to, electric generator 104. For example, a power take-off flexible cable could be used to mechanically drive a pump for inflating a tire. Electricity for use by the vehicle is produced by electric generator 104 as driveshaft 106 is rotated by the exhaust gasses. After the exhaust gasses have acted on driveshaft 106, they are released from turbosonic generator 100 via exhaust port 112. Further details of how driveshaft 106 is rotated and how the exhaust gasses are released is described in greater detail later herein.

Turbosonic generator housing 102 typically comprises a hollow, metallic, cylindrical body traditionally used to suppress engine noise, generally in the shape of a traditional muffler. While dimensions may vary widely, typical dimensions for a mid-sized passenger vehicle are 24 inches in length, 9 inches in width and 5 inches in height. The metallic material is chosen to withstand high temperatures from the hot exhaust gasses from the vehicle exhaust manifold. Turbosonic generator 100 not only suppresses engine noise as traditional mufflers do, but additionally provides electricity for use by a vehicle via driveshaft 106 and electric generator 104. It turbosonic generator 100 replaces a traditional muffler to provide both sound suppression and energy generation.

Electric generator 104 may be attached with bracket 114, typically comprises an alternator or a generator that produces electrical power upon rotation of a shaft that is mechanically coupled to driveshaft 106. In another embodiment, driveshaft 106 comprises one or more magnets arranged as an alternator rotor. In this embodiment, an alternator stator assembly receives the alternator rotor wherein electricity is generated as would be the case with a standard alternator mechanically coupled to driveshaft 106. The shaft typically turns a rotor inside electric generator 104 which, in connection with a magnetic stator, produces electricity as the shaft is rotated by driveshaft 106. Electric generator 104 is sized to provide additional electrical power to a vehicle, and the chosen size may depend on factors such as energy requirements of electronic systems onboard a vehicle, as well as space constraints underneath a vehicle where electric generator 104 is mounted. In alternative embodiments, electric generator 104 may be offset-mounted to housing 102 using bracket 114 and be mechanically coupled to driveshaft 106 via one or more gears, cables, pulleys, chains, belts, etc. It should be understood that bracket 114, while shown in a particular configuration in FIG. 1, may comprise a variety of other shapes and sizes, and be mechanically coupled to housing 102 at different locations. Electric generator 104 may alternatively be mounted to a vehicle body and coupled to driveshaft 106 using the mechanical coupling means previously mentioned.

Electric generator 104 may produce a wide range of power voltage requirements for a vehicle, depending on factors such as the size of electric generator 104 and the volume and velocity of exhaust gasses traveling from the exhaust manifold. The electrical output of the electric generator can vary with engine speed and volume of exhaust gases and is normally controlled by an internal voltage regulator. The typical output of an electric generator 104 using a vehicle alternator is maintained at 14.0 volts and up to 40 amperes of current for most engine speeds.

Electric generator 104 may be mounted directly to driveshaft 106 as shown in FIG. 1 or, in alternative embodiments, may be mounted offset from driveshaft 106 and mechanically coupled to driveshaft 106 via mechanical coupling means, such as a flexible cable shaft, geared differential, belt driven pulley or universal joints with a drive shaft. Each of these embodiments drive electric generator 104 to satisfy electrical power requirements.

Figure 2:
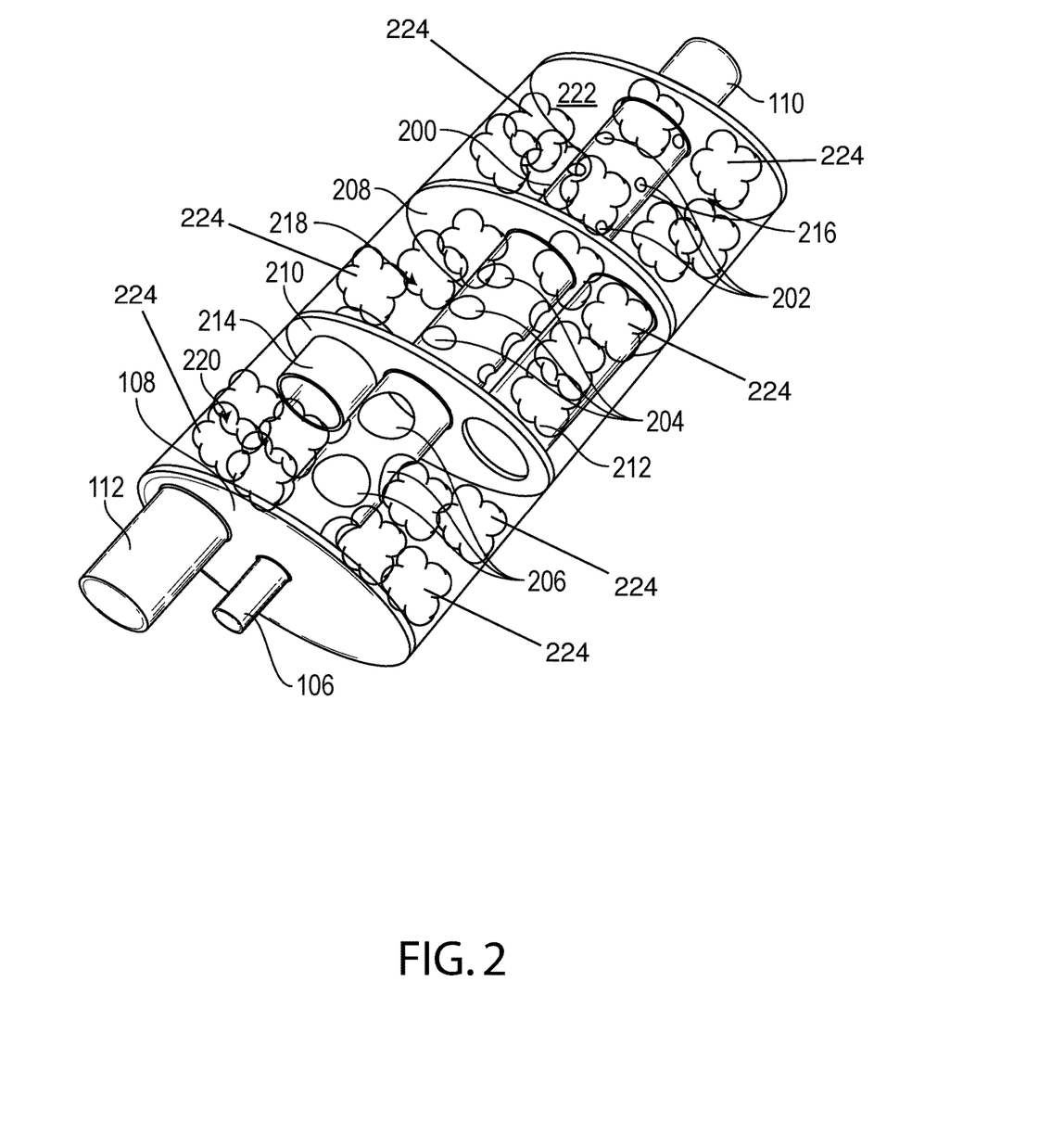
FIG. 2 is a perspective, cutaway view of the turbosonic generator as shown in FIG. 1, with the top portion of the turbosonic generator housing removed.

FIG. 2 is a perspective, cutaway view of a turbosonic generator 100 as shown in FIG. 1, with the top portion of turbosonic generator housing 102 removed. Shown are driveshaft 106. first end wall 108, inlet 110, exhaust port 112, ventilated tube 200, orifices 202, 204 and 206, first partition 208, second partition 210, connecting tube 212, connecting tube 214, first chamber 216, second chamber 218, third chamber 220, and second end wall 222. Electric generator 104 has been omitted from this view in order to focus on the functional elements of turbosonic generator 100.

As explained previously, exhaust gasses from a vehicle's exhaust manifold enter turbosonic generator 100 via inlet port 110. The exhaust gasses turn driveshaft 106, located along the length of turbosonic generator 100 inside of ventilated tube 200, protruding from end 108. The exhaust gasses are vented through the orifices 202, 204 and 206 formed throughout the length of ventilated tube 200. The orifices may comprise different sizes or they may be all sized the same. In the embodiment shown in FIG. 2, orifices 202 are all roughly the same size and located in a first chamber 216 formed by turbosonic generator housing 102, first partition 208 and second end wall 222. In this embodiment, orifices 204 comprise sizes that are larger than orifices 202, and are formed through ventilated tube 200 in an area bounded by second chamber 218, formed by turbosonic generator housing 102, first partition 208 and second partition 210. Also in this embodiment, orifices 206 comprise sizes that are larger than orifices 204, and are formed through ventilated tube 200 in a turbosonic generator bounded by third chamber 220, formed by turbosonic generator housing 102, second partition 210 and first end wall 108. While FIG. 2 illustrates turbosonic generator 100 having three chambers, in other embodiments, a greater or a fewer number of chambers could be used. For example, in one embodiment, only a single chamber is defined by the interior of turbosonic generator housing, i.e., no partitions are used. In this embodiment, turbosonic generator 100 acts as a "glass pack" or "cherry bomb" muffler, where the exhaust more freely enters and exits turbosonic generator 100, creating less backpressure than multi-chamber designs. The sound out of such a single-chamber design generally causes the sound volume to be greater than in a multi-chambered design, as well as the frequency response. In this embodiment, sound-deadening material 224 is typically packed in the space between an exterior surface of ventilator shaft 200 and inside walls of turbosonic generator 100, such as steel wool, fiberglass, or the like.

Regarding the orifices, in embodiments other than what is shown in FIG. 2, they may be formed as any geometric shape along ventilated tube 200. Further, while the embodiment in FIG. 2 shows the orifices in each chamber the same size as other orifices in each respective chamber, on other embodiments, the orifices may be differently sized from each other within any given chamber. In yet another embodiment, the orifices may generally be the same size along the length of ventilated tube 200. In yet other embodiments, the orifices located in one chamber may be larger or smaller than the orifices in the other chamber(s). The varying orifice sizes, in combination with their respective chambers, attenuates exhaust noise at different frequencies, as will be explained in greater detail later herein.

It should also be understood that although the chambers shown in FIG. 2 are generally the same size as each other, in other embodiments the chambers may be sized differently and/or comprise different volumes from each other, which may result in a different overall audible sound than the embodiment shown in FIG. 2. The number and size of the chambers, along with the number and sizes of the orifices formed along ventilated shaft 200, may be chosen to elicit a particular sound that may appeal to certain automotive enthusiasts. For example, for a lower, "raw" tone from turbosonic generator 100, the orifices may be sized larger than what is shown in FIG. 2, while the dimension of turbosonic generator 100 may be larger, resulting in larger chambers.

The chambers may be coupled to one another in arrangements that reduce the range of sounds emitted from turbosonic generator 100. For example, in FIG. 2, first chamber 216 is coupled to third chamber 220 via coupling tube 212 placed through first partition 208 and second partition 210, while third chamber 220 is coupled to second chamber 218 via an opening 214 (shown as a short tube) in second partition 210. In another embodiment, a short tube is replaced by a simple hole formed through second partition 210. As exhaust enters turbosonic generator 100 via inlet 110, it drives driveshaft 106 and is released into the chambers via the orifices. The exhaust gasses entering first chamber 216 from orifices 202 travel through connecting tube 212 and into third chamber 220, where they join exhaust gasses released through orifices 206 as well as exhaust gasses released from orifices 204 in second chamber 218 via opening 214. The combined exhaust gasses are then released via outlet port 112, however at lower temperature and pressure than the exhaust gasses as they entered turbosonic generator 100. It should be understood that although the chambers are shown in FIG. 2 as being coupled to one another in the way shown, in alternative embodiments, the chambers may be coupled to one another in different ways, such as by having a hole formed through first partition 208, joining first chamber 216 directly to second chamber 218, in addition or alternatively to employing connecting tube 212. Of course, in other embodiments having a greater number of chambers, the chambers could be coupled to one another in a variety of fashions, such as a series coupling between chambers, "leap frogging" from one chamber to another chamber via the use of one or more connecting tubes, etc.

Figure 3:
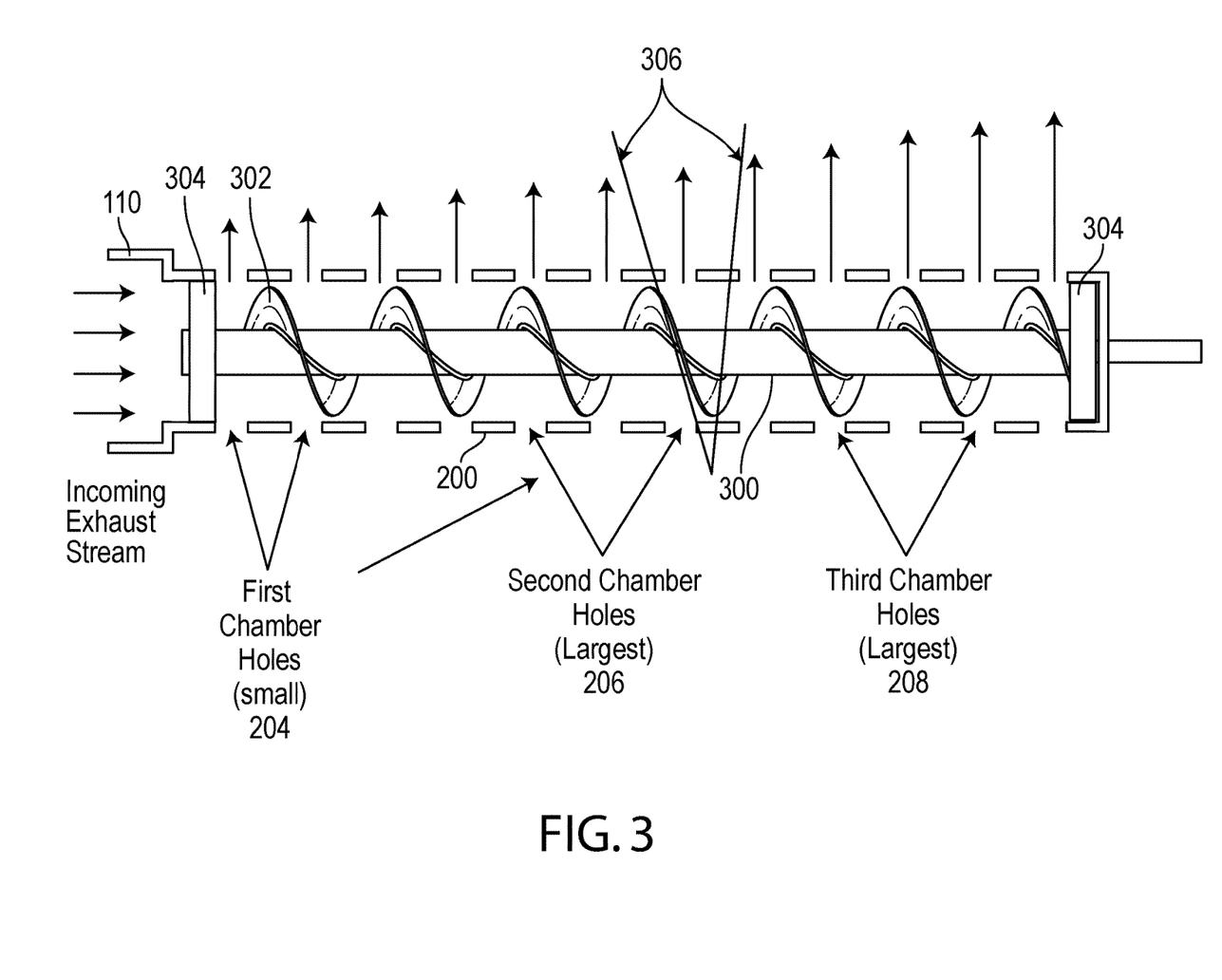
FIG. 3 is a side view of a ventilated tube and an axial fan bladed driveshaft as part of the turbosonic generator as shown in FIG. 1, with the ventilated tube shown as transparent in order to show the axial fan bladed driveshaft.
Figure 4:
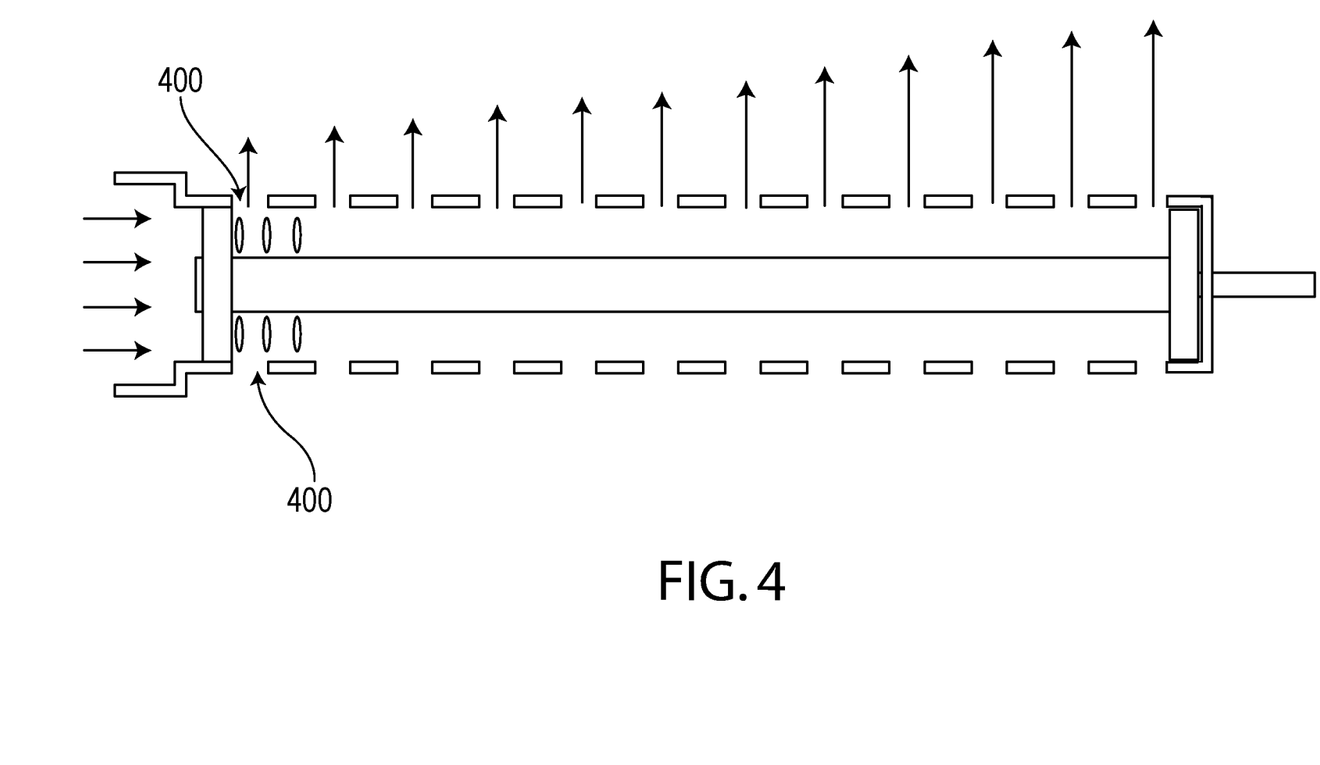
FIG. 4 is a side view of an alternative embodiment of the driveshaft shown in FIG. 3, where a axial fan blade of the driveshaft is replaced by one or more stacked fan blades.

FIG. 3 is a side view of ventilated tube 200 and driveshaft 106, with ventilated tube shown as transparent to show driveshaft 106. In one embodiment, driveshaft 106 comprises axel shaft 300, axial fan blade 302 end bearings 304 pitch angle 306, and seal 308. In this embodiment, axial fan blade 302 extends the entire length of axel shaft 300 while in other embodiments, axial fan blade 300 may extend only partially along the length of axel shaft 300 and be positioned near the incoming exhaust stream, near the middle of axel shaft 300 or at the far end from the incoming exhaust stream. In another embodiment, axial fan blade 302 is not used but, rather, two or more stacked fan blades 400 are used in its place, as shown in FIG. 4. In this embodiment, fan blades 400 may configured to resemble fan blades found in other applications, such as wind power turbines, where each blade is curved in cross-section to resemble a wing, creating torque to rotate driveshaft 106. In other embodiments, fan blades 400 may be flat and arranged at an angle to the exhaust gasses, such as the blades of a windmill. It should be understood that a greater or a fewer number of fan blades may be used in other embodiments as compared to the embodiment shown in FIG. 4, and that the fan blades in these alternative embodiments may be spaced apart from one another different and placed at various locations along the length of axial shaft 300.

Returning now to FIG. 3, incoming exhaust gasses act against the axial fan blade 302 and cause the axel shaft 300 to rotate. The exhaust gasses are prevented from exiting ventilated tube 200 by seal 308, forcing the gasses out through the orifices. In one embodiment, seal 308 comprises second end wall 222. While ventilation tube 200 is shown as extending the full length of turbosonic generator housing 102, in other embodiments, it may only extend part-way into the housing 102 and be supported by a base, standoff, or the like in order to maintain a parallel relationship with the turbosonic generator housing 102. Axial fan blade 302 forms an angle 306 or pitch with respect to both axel shaft 300 and driveshaft 106 that optimizes the force exerted by the exhaust gasses against axial fan blade 302. Pitch is defined as the number of turns per inch of axel shaft utilized. In one embodiment, angle 306 comprises 45 degrees or a high pitch. In other embodiments, angle 306 may be greater or less than 45 degrees. As angle 306 is increased or pitch lowered, the exhaust gasses generally pass with less resistance through turbosonic generator 100, thereby decreasing backpressure, which is generally desirable. However, decreasing the angle or increasing the pitch will result in higher back pressure and higher torque transmitted to driveshaft 106. A standard automotive alternator puts out 60 amps @ 14 volts=840 Watts. 1 horsepower=746 Watts, so, in an embodiment where electric generator 104 comprises a standard automotive alternator, the alternator will generally require over one horsepower in order to achieve maximum output from the alternator. Thus, in this embodiment, the axial fan blade 302 should be designed to achieve at least 1 horsepower. In other embodiments, where a standard alternator is replaced with a power generation device that outputs more or less power, axial fan blade 302 should be designed to achieve at least the required horsepower to achieve a desired output. This may additionally involve sizing 100 turbosonic generator 100 larger or smaller than a standard muffler.

While axial fan blade 302 is shown in FIG. 2 as having two blades "fins", in other embodiments, it could comprise three, four or even more blade fins.

Figure 5:
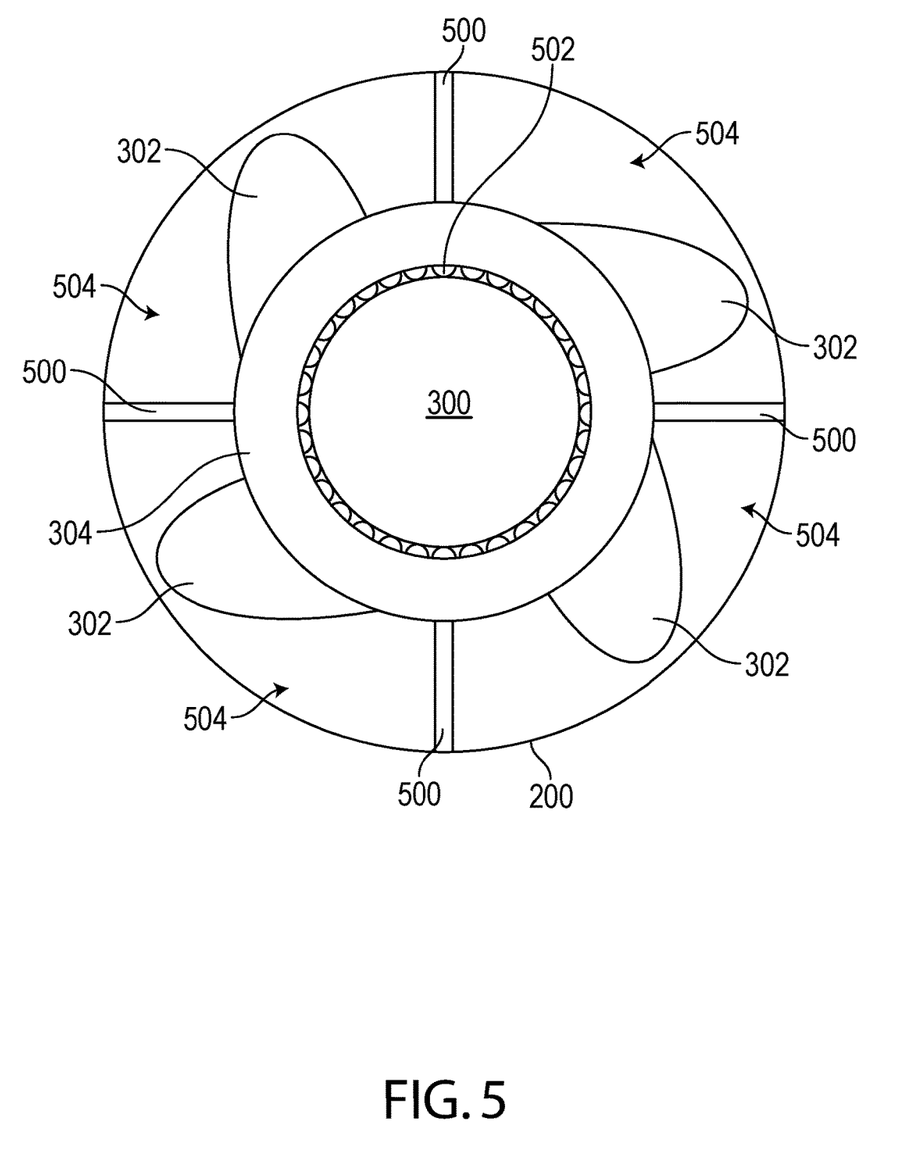
FIG. 5 illustrates a planar view of one embodiment of an exhaust-passing, front bearing assembly used to support the driveshaft as shown in FIG. 3 and allow exhaust gasses to pass from an inlet of the turbosonic generator into the ventilated tube, also shown in FIG. 3.

Driveshaft 106 is supported by two bearing assemblies 304 which are typically located at each end of turbosonic generator 100. The bearings allow driveshaft 106 to rotate within ventilated tube 200 with minimal friction. The bearing assembly located near second end wall 222 (i.e., nearest the exhaust entry point) may be formed as to allow the exhaust to enter turbosonic generator 100 while still allowing driveshaft 106 to rotate freely. Such an exhaust-passing front bearing assembly is shown in FIG. 5 in a front, planar view, looking down the length of ventilated tube 200. Here, axel shaft 300 of driveshaft 106 is shown held within exhaust-passing bearing assembly 304 via bearings 502. The bearings may be metal or ceramic. Axial fan blades 302 are shown protruding from axel shaft 300. The bearing assembly is held in place, in this embodiment, four struts 500. However, the number of struts can vary from two more depending on the forces exerted by turning axel shaft. By housing the bearing assembly using struts 500, exhaust gasses are free to enter ventilated tube 200 through the spaces 504 between the struts 500 to turn driveshaft 106.

Figure 6:
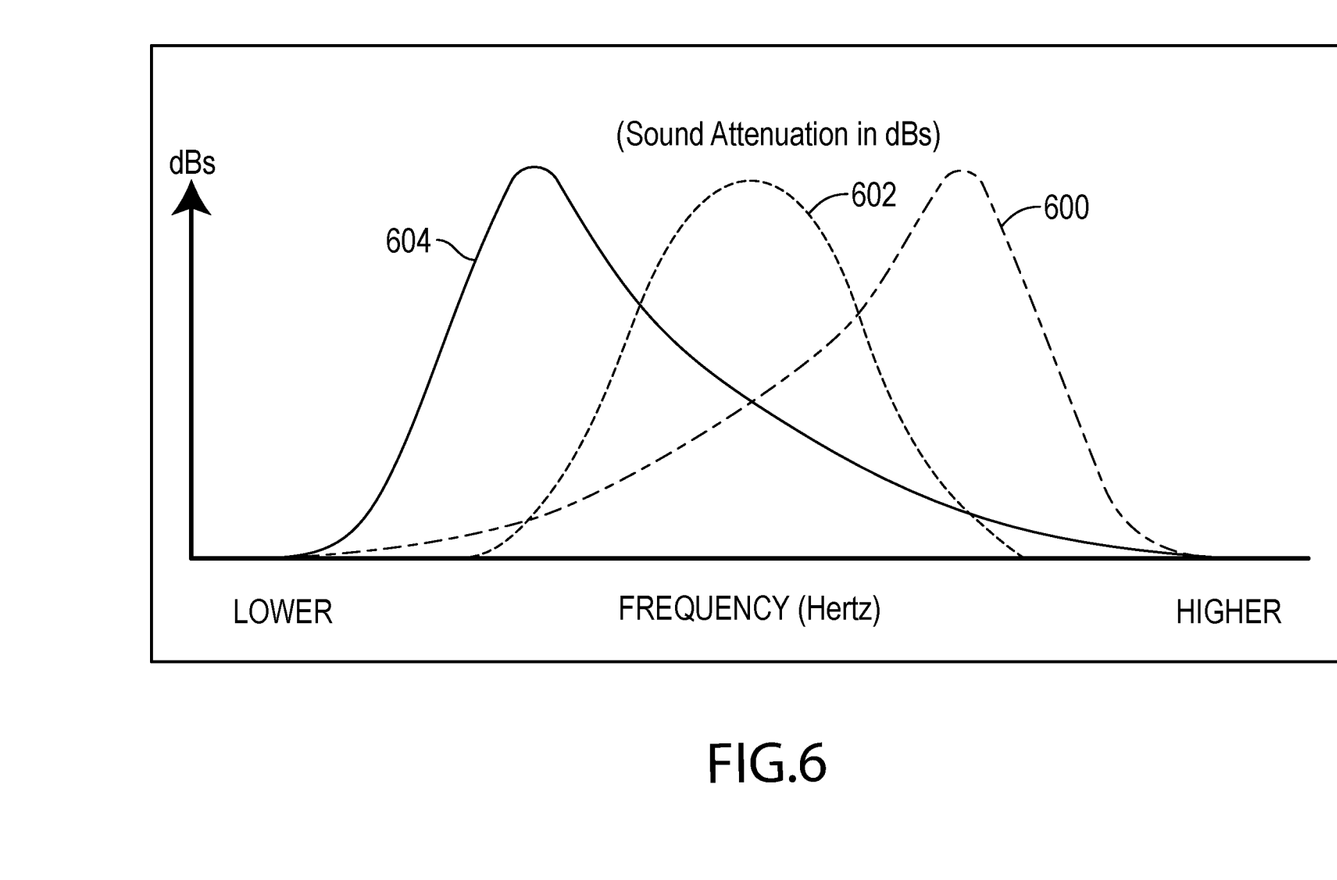
FIG. 6 is a graph, illustrating the sound attenuation effect of each resonant chamber formed within the turbosonic generator as shown in FIGS. 1 and 2.

FIG. 6 is a graph, illustrating the dampening effects of each of the chambers of turbosonic generator 100 three chamber configuration. Each of the chambers 216, 218 and 220 may be formed as resonant chambers, which create acoustical resonance in the flow of exhaust gasses that uses positive and negative sound reverberation to amplify or cancel specific sound waves. As shown, plot 600 illustrates the sound attenuation characteristics of first chamber 216 over a range of relatively higher frequencies, such as between 2,000 Hz and 8,000 Hz due to the shape and volume of first chamber 216. Plot 602 illustrates the sound attenuation characteristics of second chamber 218 over a mid-range of frequencies, such as between 250 Hz and 2,000 kHz. Plot 604 illustrates the sound attenuation characteristics of third chamber 220 over a lower range of frequencies, such as between 20 kHz and 250 Hz, having a peak coinciding with a frequency that is less than the peak attenuation frequency of plot 602. The sound from the exhausts add together before finally being expelled through exhaust port 112, resulting in an acoustically dampened sound output from the vehicle, as well as having a sound characteristic that is generally pleasing.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A turbosonic generator for generating electricity for a vehicle, comprising:
   a turbosonic generator housing sized and shaped in the form of a vehicle muffler;
   a driveshaft;
   a ventilated tube mounted over the driveshaft and within the turbosonic generator housing, extending along an entire length of the turbosonic generator housing, the ventilated tube comprising first and second ends, the first end formed through a first end partition of the turbosonic generator housing and comprising an inlet for receiving exhaust gasses from a vehicle engine, and the second end comprises an end wall for preventing the exhaust gasses from escaping through the second end, the ventilated tube further comprising exhaust orifices for allowing the exhaust gasses to escape the ventilated tube;
   means, coupled to a second end of the driveshaft, for producing electricity as the exhaust gasses cause the driveshaft to rotate; and
   an interior partition inside the turbosonic generator housing forming at least two resonant chambers therein;
   wherein the orifices of the ventilated tube in a first of the at least two resonant chambers are a first size and the orifices of the ventilated tube in a second of the at least two resonant chambers are a second size different in size than the first size.

2. The turbosonic generator of claim 1, further comprising:
   a hole formed through the interior partition, coupling the first sound chamber with the second sound chamber.

3. The turbosonic generator of claim 1, wherein the driveshaft comprises a continuous axial fan blade formed along the length of the driveshaft.

4. The turbosonic generator of claim 1, wherein the driveshaft comprises a series of stacked fan blades formed along a portion of the driveshaft.

5. The turbosonic generator of claim 1, wherein the means for producing electricity comprise an alternator.

6. The turbosonic generator of claim 1, further comprising:
   a second interior partition formed within the turbosonic generator housing, perpendicular to the length of the turbosonic generator housing;
   wherein the interior partition and a first end of the turbosonic generator housing form a first resonant chamber, the interior partition and the second interior partition form a second resonant chamber, and the second interior partition and a second end of the turbosonic generator housing form a third chamber;
   wherein the orifices of the ventilated tube in the first resonant chamber comprise the first size, the orifices of the ventilated tube in the second resonant chamber comprise the second size different in size than the first size, and the orifices of the ventilated tube in the third resonant chamber comprise a third size different in size than the first size and the second size.

7. The turbosonic generator of claim 6, wherein the orifices of the ventilated tube in the first resonant chamber are smaller than the orifices of ventilated tube in the second resonant chamber.

8. The turbosonic generator of claim 6, wherein the orifices of the ventilated tube in the second resonant chamber are smaller than the orifices of the ventilated tube in the third resonant chamber.

9. The turbosonic generator of claim 6, wherein the orifices of the ventilated tube in the first resonant chamber are smaller than the orifices of the ventilated tube in the second resonant chamber, and the orifices of the ventilated tube in the second resonant chamber are smaller than the orifices of the ventilated tube in the third resonant chamber.

10. The turbosonic generator of claim 6, wherein the first resonant chamber attenuates sound frequencies in a first frequency band, the second resonant chamber attenuates sound frequencies in a second frequency band, and the third resonant chamber attenuates sound frequencies in a third frequency band.

11. The turbosonic generator of claim 6, further comprising:
    a connecting tube formed through the interior partition and the second interior partition, coupling the first resonant chamber with the third resonant chamber.

12. The turbosonic generator of claim 6, further comprising:
    a hole formed through the second interior partition, coupling the second resonant chamber with the third resonant chamber.

13. The turbosonic generator of claim 6, further comprising:
    a connecting tube formed through the interior partition and the second interior partition, coupling the first resonant chamber with the third resonant chamber; and
    a hole formed through the second interior partition, coupling the second resonant chamber with the third resonant chamber.

14. A turbosonic generator for generating electricity for a vehicle, comprising:
    a turbosonic generator housing sized and shaped in the form of a vehicle muffler;
    a ventilated tube disposed within the turbosonic generator housing and extending along an entire length of the turbosonic generator housing, the ventilated tube comprising an inlet for receiving exhaust gasses from a vehicle engine, and an outlet port for allowing the exhaust gasses to escape, the ventilated tube further comprising orifices for allowing sound associated with the exhaust gasses to escape from the ventilated tube;
    a driveshaft disposed within the ventilated tube;
    porous, sound-deadening material placed between the ventilated tube and the turbosonic generator housing; and
    means, coupled to the driveshaft, for producing electricity as the exhaust gasses cause the driveshaft to rotate;
    an interior partition inside the turbosonic generator housing forming at least two resonant chambers therein;
    wherein the orifices of the ventilated tube in a first of the at least two resonant chambers are a first size and the orifices of the ventilated tube in a second of the at least two resonant chambers are a second size different in size than the first size.

15. The turbosonic generator of claim 14, wherein the driveshaft comprises a continuous axial fan blade formed along the length of the driveshaft.

16. The turbosonic generator of claim 14, wherein the driveshaft comprises a series of blades formed along a portion of the driveshaft.

17. The turbosonic generator of claim 14, wherein the orifices of the ventilated tube increase in size along a length of the ventilated tube from an exhaust inlet of the ventilated tube to an exhaust outlet of the ventilated tube.

18. The turbosonic generator of claim 14, wherein the orifices of the ventilated tube decrease in size along a length of the ventilated tube from an exhaust inlet of the ventilated tube to an exhaust outlet of the ventilated tube.

* * * * *